(12) United States Patent  
Forte

(10) Patent No.: US 11,676,515 B2
(45) Date of Patent: *Jun. 13, 2023

(54) CONTENT ENCRYPTION AND IN-PLACE DECRYPTION USING VISUALLY ENCODED CIPHERTEXT

(71) Applicant: Andrea G. Forte, Brooklyn, NY (US)

(72) Inventor: Andrea G. Forte, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,055

(22) Filed: Apr. 7, 2022

(65) Prior Publication Data

US 2022/0230563 A1 Jul. 21, 2022

Related U.S. Application Data

(63) Continuation of application No. 16/272,117, filed on Feb. 11, 2019, now Pat. No. 11,335,214.

(51) Int. Cl.
| | |
|---|---|
| *G09C 5/00* | (2006.01) |
| *H04L 9/32* | (2006.01) |
| *G06F 21/64* | (2013.01) |
| *G06F 21/62* | (2013.01) |

(52) U.S. Cl.
CPC .......... *G09C 5/00* (2013.01); *G06F 21/6245* (2013.01); *G06F 21/64* (2013.01); *H04L 9/3236* (2013.01)

(58) Field of Classification Search
CPC ....... G09C 5/00; H04L 9/3236; H04L 9/3239; H04L 9/3231; H04L 2209/38; G06F 21/64; G06F 21/6245; G06F 21/84; G06F 21/602

See application file for complete search history.

(56) References Cited

U.S. PATENT DOCUMENTS

| | | | |
|---|---|---|---|
| 9,183,677 B2 | 11/2015 | Harple | |
| 9,251,366 B2 | 2/2016 | Forte | |
| 9,330,272 B2 | 5/2016 | Koo | |
| 9,396,310 B2 * | 7/2016 | de los Reyes | ...... G06F 21/6245 |
| 9,893,890 B2 | 2/2018 | Melzer | |

(Continued)

FOREIGN PATENT DOCUMENTS

| | | |
|---|---|---|
| CN | 107248135 A | 10/2017 |
| WO | 2014005736 A1 | 1/2014 |

OTHER PUBLICATIONS

US 9,213,854 B2, 12/2015, Koo (withdrawn)

*Primary Examiner* — Michael R Vaughan
(74) *Attorney, Agent, or Firm* — Gearhart Law LLC; David Postolski

(57) ABSTRACT

Systems and methods are provided for encrypting and decrypting data using visually encoded ciphertext. The method includes selecting, using a graphical user interface coupled to an electronic device, one or more portions of a document to be encrypted, visually encoding the selected one or more portions of the document, generating a visual representation, wherein the visual representation corresponds to encrypted content, and replacing the selected one or more portions of the document with the visual representation. The method further includes displaying, to the user, the visual representation, capturing the visual representation using one or more cameras, decoding the visual representation, obtaining the encrypted content, and decrypting the encrypted content, generating decrypted content.

20 Claims, 7 Drawing Sheets

(56) References Cited

U.S. PATENT DOCUMENTS

| | | | |
|---|---|---|---|
| 9,948,659 B2 | 4/2018 | Harple | |
| 10,706,161 B2* | 7/2020 | Engel | G06F 3/0304 |
| 2009/0129591 A1* | 5/2009 | Hayes | H04L 9/32 |
| | | | 380/51 |
| 2010/0074443 A1* | 3/2010 | Ishii | H04N 1/32144 |
| | | | 380/243 |
| 2015/0090791 A1* | 4/2015 | Zhang | G06K 7/1417 |
| | | | 235/462.04 |
| 2015/0090792 A1* | 4/2015 | Zhang | G06K 7/1417 |
| | | | 235/462.04 |
| 2015/0295715 A1 | 10/2015 | Melzer | |
| 2015/0296170 A1* | 10/2015 | Farrell | H04N 9/8227 |
| | | | 386/254 |
| 2015/0356306 A1* | 12/2015 | Carter | G06F 21/64 |
| | | | 380/246 |
| 2017/0032573 A1* | 2/2017 | Dow | G06F 21/606 |
| 2017/0140144 A1* | 5/2017 | Bock | G06V 10/95 |
| 2017/0161506 A1* | 6/2017 | Gates | G09C 5/00 |
| 2018/0040164 A1* | 2/2018 | Newman | H04N 19/46 |
| 2018/0167215 A1 | 6/2018 | Melzer | |
| 2018/0204206 A1* | 7/2018 | Flurscheim | G06Q 20/3821 |
| 2018/0234588 A1* | 8/2018 | Chen | G06V 40/172 |
| 2018/0307883 A1* | 10/2018 | Ebrahimi | G06K 7/1439 |
| 2019/0149335 A1* | 5/2019 | Kim | G09C 5/00 |
| | | | 713/155 |
| 2020/0028826 A1* | 1/2020 | Li | G06V 10/46 |

\* cited by examiner

Non-overlaid content

Overlaid content

Example of Transaction Summary with PIN

Time: 06-04-2018 18:57
From: 1GQHPrvLi35hEy1K3B1dyf75WyzFHkFQ1v
To:   7QPHrvLo55tEy1T3C6dyf22WrzPHInEL5x
Amount: USD 1,000
PIN: 83620248

FIG. 4

CONTENT ENCRYPTION AND IN-PLACE DECRYPTION USING VISUALLY ENCODED CIPHERTEXT

CROSS-REFERENCE TO RELATED APPLICATIONS SECTION

This application is a U.S. Non-Provisional Patent Application and a Continuation Patent Application that claims priority to U.S. Non-Provisional patent application Ser. No. 16/272,117 filed on Feb. 11, 2019, issued as U.S. Pat. No. 11,335,214 issued on May 17, 2022, the contents of which is hereby incorporated by reference in their entirety.

FIELD OF THE INVENTION

This invention relates to content encryption and decryption using visually encoded ciphertext.

BACKGROUND OF THE EMBODIMENTS

In many scenarios, only certain parts of a document contain sensitive information and need to be encrypted (e.g., account balance in a bank statement, SSN in a tax return). However, the present approach to encryption is "all or nothing", requiring an entire document to either be encrypted or not. A system and method for efficiently enabling users to selectively encrypt and visually embed pieces of data in a larger body of data is thus needed.

Examples of related art are described below:

U.S. Pat. No. 9,183,677 generally describes a system that allows a camera enabled application, such as an augmented reality application, to run in a protected area may include a first device including a camera, the camera including a secure mode of operation and a display, an image processing module configured to convert image data from the camera to encoded data when the camera is in the secure mode and protect image data stored in the system, an encryption module configured to encrypt encoded data from the image processing module, and a protected audiovisual path mechanism configured to securely send augmented encoded data to the display.

U.S. Pat. No. 9,213,854 generally describes a head-mounted display (HMD) apparatus and a method for accessing encrypted information by the apparatus, in which the head-mounted display apparatus with enhanced security includes a biometric information input unit that receives biometric information of a user; a communication module that transmits or receives information to or from a server; a memory that stores encrypted information; a processor that transmits the biometric information received through the biometric information input unit to a user authentication server through the communication module, receives access privilege information from the user authentication server, and decrypts the encrypted information stored in the memory based on the received access privilege information; and a display unit that displays the decrypted information through the processor.

U.S. Pat. No. 9,251,366 generally describes a method, non-transitory computer readable medium and apparatus for decrypting a document are disclosed. For example, the method captures a tag on an encrypted document, transmits the tag to an application server of a communication network to request a per-document decryption key, receives the per-document decryption key if the tag is authenticated, and decrypts a portion of the encrypted document using a temporary decryption key contained in the tag, the tag decrypted with the per-document decryption key.

U.S. Pat. No. 9,330,272 generally describes a head-mounted display (HMD) apparatus and a method for accessing encrypted information by the apparatus, in which the head-mounted display apparatus with enhanced security includes a biometric information input unit that receives biometric information of a user; a communication module that transmits or receives information to or from a server; a memory that stores encrypted information; a processor that transmits the biometric information received through the biometric information input unit to a user authentication server through the communication module, receives access privilege information from the user authentication server, and decrypts the encrypted information stored in the memory based on the received access privilege information; and a display unit that displays the decrypted information through the processor.

U.S. Pat. No. 9,893,890 generally describes a method of decrypting an encrypted message. The method comprises storing a wearer decryption code in a memory of a wearable mobile device having a head-worn augmented display which generates an augmented reality view for a wearer of the wearable mobile device, capturing using the wearable mobile device a video sequence including at least one frame imaging a visible code using an image sensor of the wearable mobile device, processing the video sequence to identify the visible code, decrypting the visible code using the wearer decryption code to create an decrypted content, and presenting the decrypted content on top of at least some of the visible code in the augmented reality view.

U.S. Pat. No. 9,948,659 generally describes a system that allows a camera enabled application, such as an augmented reality application, to run in a protected area may include a first device including a camera, the camera including a secure mode of operation and a display, an image processing module configured to convert image data from the camera to encoded data when the camera is in the secure mode and protect image data stored in the system, an encryption module configured to encrypt encoded data from the image processing module, and a protected audiovisual path mechanism configured to securely send augmented encoded data to the display.

U.S. Patent Publication No. 2015/0295715 generally describes a method of decrypting an encrypted message. The method comprises storing a wearer decryption code in a memory of a wearable mobile device having a head-worn augmented display which generates an augmented reality view for a wearer of the wearable mobile device, capturing using the wearable mobile device a video sequence including at least one frame imaging a visible code using an image sensor of the wearable mobile device, processing the video sequence to identify the visible code, decrypting the visible code using the wearer decryption code to create an decrypted content, and presenting the decrypted content on top of at least some of the visible code in the augmented reality view.

U.S. Patent Publication No. 2018/0167215 generally describes a method of decrypting an encrypted message. The method comprises storing a wearer decryption code in a memory of a wearable mobile device having a head-worn augmented display which generates an augmented reality view for a wearer of the wearable mobile device, capturing using the wearable mobile device a video sequence including at least one frame imaging a visible code using an image sensor of the wearable mobile device, processing the video sequence to identify the visible code, decrypting the visible code using the wearer decryption code to create an decrypted content, and presenting the decrypted content on top of at least some of the visible code in the augmented reality view.

International Patent Publication No. WO2014/005736A1 generally describes a method for providing private information to a user, comprising the steps of a) Encrypting one or more private messages including private information for one or more users, b) Encoding the encrypted one or more messages into an public content stream including public content for public presentation, c) Analog presenting of the public content stream, wherein the encoded one or more messages are human-unperceivable. d) Capturing the presented public content stream by a user device of a user, e) Decoding the one or more encrypted private messages from the captured public content stream for the user, f) Decrypting the decoded one or more encrypted private messages, g) Providing the decrypted private information to the user. It also relates to a system for providing private information to a user.

None of the art described above addresses all of the issues that the present invention does.

SUMMARY OF THE EMBODIMENTS

According to an aspect of the present invention, a method for encrypting and decrypting data using visually encoded ciphertext is provided. The method includes selecting, using a graphical user interface coupled to an electronic device, one or more portions of a document to be encrypted, visually encoding the selected one or more portions of the document, generating a visual representation, wherein the visual representation corresponds to encrypted content, and replacing the selected one or more portions of the document with the visual representation. The method further includes displaying, to the user, the visual representation, capturing the visual representation using one or more cameras, decoding the visual representation, obtaining the encrypted content, and decrypting the encrypted content, generating decrypted content.

It is an object of the present invention to provide the method for encrypting and decrypting data using visually encoded ciphertext, wherein the visual representation is a still image.

It is an object of the present invention to provide the method for encrypting and decrypting data using visually encoded ciphertext, wherein the visual representation is part of a video feed.

It is an object of the present invention to provide the method for encrypting and decrypting data using visually encoded ciphertext, wherein capturing the visual representation includes capturing two or more visual representations, and wherein decoding the visual representation includes simultaneously decoding the two of more visual representations.

It is an object of the present invention to provide the method for encrypting and decrypting data using visually encoded ciphertext, wherein decrypting the encrypted content further includes decrypting the encrypted content using predetermined cryptographic key material.

It is an object of the present invention to provide the method for encrypting and decrypting data using visually encoded ciphertext, wherein the visual representation includes one or more formats selected from the group consisting of; Quick Response Codes; data matrices; data glyphs, and/or any other relevant formats.

It is an object of the present invention to provide the method for encrypting and decrypting data using visually encoded ciphertext, wherein the method further includes displaying some or all of the decrypted content.

It is an object of the present invention to provide the method for encrypting and decrypting data using visually encoded ciphertext, wherein displaying the encrypted content further includes overlaying the decrypted content over one or more objects.

It is an object of the present invention to provide the method for encrypting and decrypting data using visually encoded ciphertext, wherein the decrypted content is internally used by a computer system to perform one or more tasks.

It is an object of the present invention to provide the method for encrypting and decrypting data using visually encoded ciphertext, wherein the document includes a plurality of visual representations, and wherein the method further includes performing an integrity check of the encrypted content of the plurality of visual representations.

It is an object of the present invention to provide the method for encrypting and decrypting data using visually encoded ciphertext, wherein the performing the integrity check further includes generating a hash of each of the visual representations in an order in which each of the visual representations appears in the document and comparing the hash to a hash generated when the encrypted content was encrypted.

According to another aspect of the present invention, a system for encrypting and decrypting data using visually encoded ciphertext is provided. The system includes a first electronic device including a graphical user interface, a first memory, and a first processor, wherein the graphical user interface is configured to enable a user to select one or more portions of a document to be encrypted, wherein the first processor is configured to: visually encode the selected one or more portions of the document, generating a visual representation, wherein the visual representation corresponds to encrypted content; replace the selected one or more portions of the document with the visual representation; and display, to the user, the visual representation. The system further includes a second electronic device, including a camera, a second processor, and a second memory, wherein the camera is configured to capture the visual representation, and wherein the second processor is configured to: decode the visual representation, obtaining the encrypted content; and decrypt the encrypted content, generating decrypted content.

It is an object of the present invention to provide the system for encrypting and decrypting data using visually encoded ciphertext, wherein the visual representation is a still image.

It is an object of the present invention to provide the system for encrypting and decrypting data using visually encoded ciphertext, wherein the visual representation is part of a video feed.

It is an object of the present invention to provide the system for encrypting and decrypting data using visually encoded ciphertext, wherein capturing the visual representation includes capturing two or more visual representations, and wherein decoding the visual representation includes simultaneously decoding the two of more visual representations.

It is an object of the present invention to provide the system for encrypting and decrypting data using visually encoded ciphertext, wherein decrypting the encrypted content further includes decrypting the encrypted content using predetermined cryptographic key material.

It is an object of the present invention to provide the system for encrypting and decrypting data using visually encoded ciphertext, wherein the visual representation includes one or more formats selected from the group consisting of: Quick Response Codes; data matrices; data glyphs, and/or any other relevant formats.

It is an object of the present invention to provide the system for encrypting and decrypting data using visually encoded ciphertext, wherein the second electronic devices further includes a display, configured to display some or all of the decrypted content.

It is an object of the present invention to provide the system for encrypting and decrypting data using visually encoded ciphertext, wherein the decrypted content is internally used by a computer system to perform one or more tasks.

It is an object of the present invention to provide the system for encrypting and decrypting data using visually encoded ciphertext, wherein the document includes a plurality of visual representations, and wherein the second processor is further configured to perform an integrity check of the encrypted content of the plurality of visual representations.

BRIEF DESCRIPTION OF THE DRAWINGS

FIG. 4 shows an example of transaction summary with PIN, according to an embodiment of the present invention.

DESCRIPTION OF THE PREFERRED EMBODIMENTS

Figure 1:
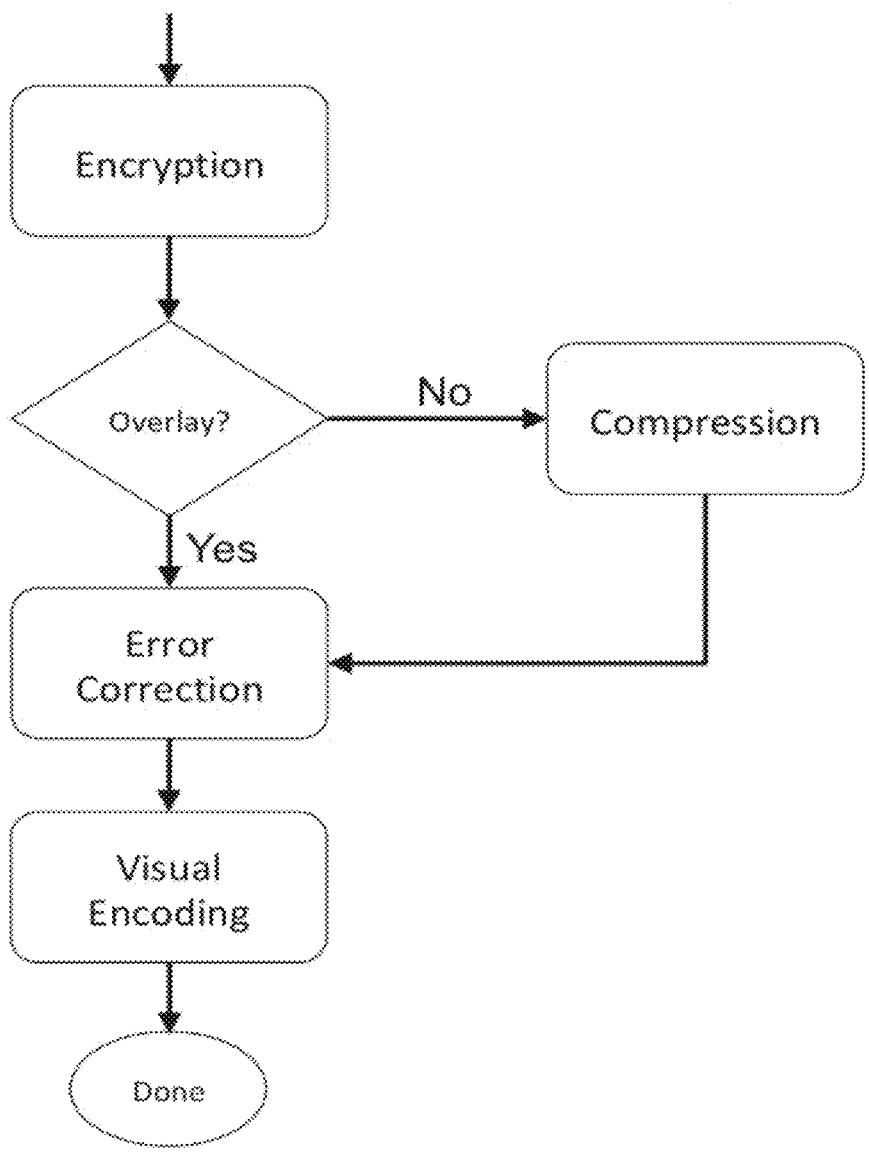
FIG. 1 shows a high-level pipeline used to convert data to visually encoded ciphertext, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

A system is provided for encrypting and displaying private content in a public setting is provided. According to an embodiment, this is done by leveraging state of the art encryption, image processing and, optionally, an augmented reality user experience.

According to an embodiment, the present system enables the encryption of pieces of sensitive information (e.g., text, images, video) in a visual way. These pieces of sensitive information may be standalone or can be part of a larger document. Most documents do not require to be entirely encrypted, as only some parts in them are sensitive. With the present invention, users may choose to encrypt only those parts of a document that they deem sensitive and encrypt them in a visual way such that decryption is similar to a "point and shoot" user experience. According to an embodiment, the encrypted pieces are embedded into the document and placed in the exact same position of their non-encrypted counterparts. According to an embodiment, users need just to point their device's camera to the encrypted pieces of information for decryption to take place on the fly, in real time. This new technology enables a plethora of new applications and provides novel solutions to a number of cybersecurity attacks (e.g., phishing attacks, man-in-the-middle attacks).

According to an embodiment, the system includes one or more electronic devices. According to an embodiment, the electronic devices include one or more cameras and/or are configured to include Internet connectivity via wired and/or wireless connection. According to an embodiment, the one or more electronic devices includes a desktop computer, a laptop computer, a tablet computer, a smart phone, smart glasses, and/or any other suitable electronic device. According to an embodiment, the one or more electronic devices include one or more displays.

According to an embodiment, the present system encrypts and visually encodes content in such a way that, in order to decrypt the content, a user needs to use a device equipped with a display and one or more cameras. According to an embodiment, the visual representation of the encrypted content is captured by one or more image capture devices, either as a still image or as part of a video feed, and is decoded and decrypted.

According to an embodiment, the decrypted content may or may not be displayed to the user, depending on the specific scenario. According to an embodiment, if the content is displayed to the user, it may be overlaid over some other content (e.g., images, logo, ads, etc.) and "anchored" to it. This option of content overlayment over some other content provides users with an augmented-reality user experience. According to an alternate embodiment, the decrypted content may be displayed anywhere on the screen of the device (e.g., at the bottom of the screen).

If the device camera captures multiple visual encodings at once (either adjacent or not), the system can simultaneously decode and decrypt the content. If the decrypted data is meant for human consumption, the system can simultaneously display the content as an overlay over some other content or anywhere else on the screen of the device.

According to an embodiment, in order for the device to be able to decrypt content, the user device needs to have access to correct cryptographic key material. According to an embodiment, the system supports both symmetric-key encryption and asymmetric-key encryption.

According to an embodiment, content is provided by a user. Content provided by the user is encrypted and "formatted" in such a way that a visual representation of this encrypted content is created (an encrypted content image). According to an embodiment, this encrypted content image may be in the form of one or more QR codes, data matrices, data glyphs, and/or some other suitable visual representation, while maintaining the spirit of the present invention. According to an embodiment, a mix of multiple visual representations may be used for the same encrypted code (e.g., a QR code surrounded by data glyphs). According to an embodiment, the user may select which content to be encrypted using a graphical user interface coupled to an electronic device. The electronic device may be, e.g., a desktop computer, a laptop computer, tablet computer, a smartphone, and/or any other suitable electronic device. According to an embodiment, there may be one or more electronic devices. According to an embodiment, the electronic devices may include, e.g., a processor, a memory, a graphical user interface, a display, one or more cameras, and/or any other relevant components.

According to an embodiment, encrypted content encoded in the encrypted content image may be of two different types: actual content and/or "pointers" to the actual content.

According to an embodiment, the actual content that either a user or a machine has provided and needs to consume is encrypted and visually encoded (the "actual content"). According to an embodiment, one or more pointers to the content to be consumed is encrypted and visually encoded (the "pointer"). A pointer, for example, could be a Uniform Resource Identifier (URI), an alphanumerical identifier (ID), and/or some other representation re-directing to the actual content. According to an embodiment, other metadata may also be present as part of the encrypted data. Content to be encrypted may be user-provided as well as machine-generated, and may be in a human-readable format or not.

According to an embodiment, in order to encrypt content, a plurality of operations are performed, the number of which depending on the functionality and user experience desired. For example, a flowchart showing high-level pipeline used to convert data to a visually encoded ciphertext is shown in FIG. 1.

According to various embodiments of the present invention, decrypted content may be "anchored" to a specific location on a device screen, may be displayed anywhere on the device screen, and/or may not be displayed at all to a user and used internally.

According to an embodiment, if the decrypted content is anchored to a specific location on the device screen, the following may happen:

1. Encrypted content is decrypted from the corresponding encrypted code;
2. By using various image processing techniques, the encrypted code is erased from the augmented reality view. According to an embodiment, logos, images, ads and/or any other suitable visual objects may be placed in its place;
3. Decrypted information is put in place of the encrypted code or overlaid over (all or part of) the logo, image, ad and/or any other suitable visual objects that replaced the encrypted code.

Figure 2A:
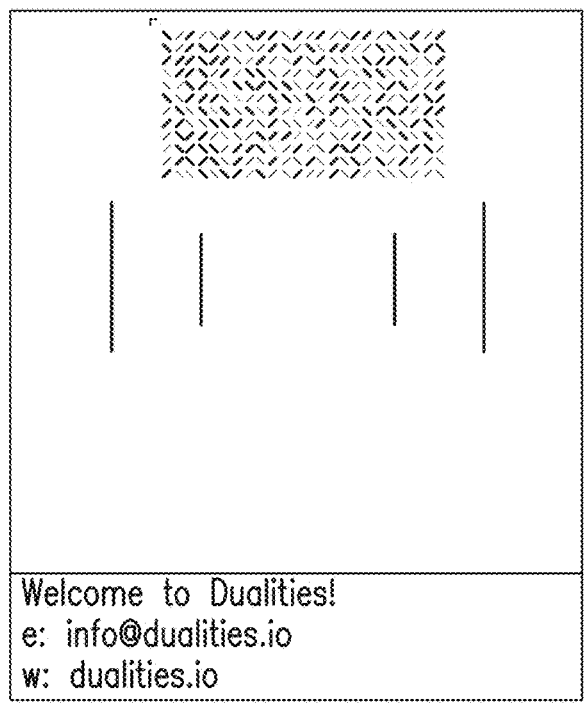
FIGS. 2A-2B show non-overlaid content (FIG. 2A) and overlaid content (FIG. 2B), according to an embodiment of the present invention.
Figure 2B:
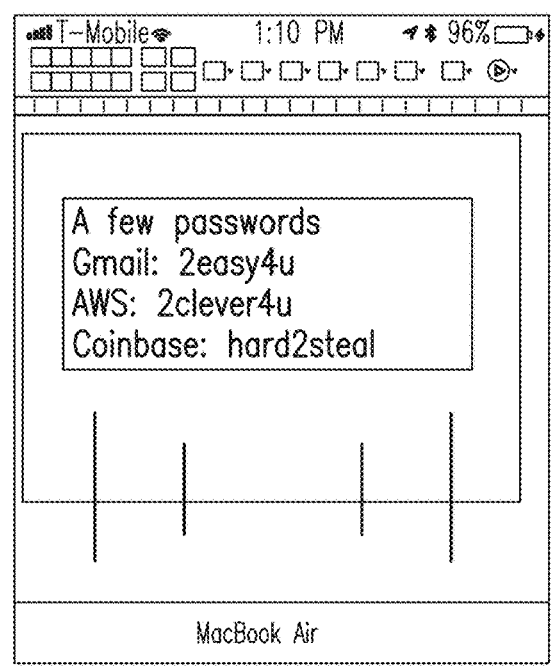

An example of overlaid content over a commercial logo "anchored" to the location previously occupied by the encrypted code is illustratively depicted in FIG. 2B, in accordance with an embodiment of the present invention. The non-overlaid content is shown in FIG. 2A.

According to an embodiment, an operations pipeline may include the following: plaintext.fwdarw.encryption.fwdarw..error correction. fwdarw.visual encoding. In such a scenario, compression may or may not be used.

According to an embodiment, with non-overlaid content, the plaintext is not anchored to a specific location or overlaid over other content, but may be displayed anywhere on the device screen.

The operations pipeline used in such a scenario may include the following: plaintext.fwdarw.compression.fwdarw.encryption.fwdarw.error correction.fwdarw.visual encoding. According to an embodiment, compression can be applied since the size of the visual encoding does not need to match the size of the decrypted content, thus it can be smaller.

In the scenario of internally-used content, the ciphertext is decrypted and the corresponding plaintext is not displayed to the user, but it is used "internally" by the system. The operations pipeline used in such a scenario may be the same as in the previous case of non-overlaid content. For example, where such a situation may occur may include the digital signing of Blockchain transactions where the encrypted information is the wallet private key.

According to an embodiment, a mixed scenario may also occur where, given one encrypted code, some decrypted elements are displayed to the user and some other elements are used internally (e.g., metadata).

According to an embodiment, one or more encryption keys may be used. Both asymmetric-key and symmetric-key encryption may be used, according to various embodiments. In particular, both per-document keys and per-user keys may be used, according to various embodiments.

Per-document keys may be used if the document will be shared among multiple parties. In such a case, each new document will use a different encryption key.

Per-user keys may be used if the document will be kept private and not shared with other parties. In such a case, multiple documents may use the same encryption key.

According to an embodiment, multiple visual encodings (either adjacent or non-adjacent) may be captured and processed all at once. This includes the scenario of having multiple visual encodings of mixed type (e.g., QR codes and data glyphs). According to an embodiment, if multiple visual encodings (i.e., blocks) are present, these are completely independent from one another and do not share any kind of information with one another, i.e., they are stand-alone entities.

According to an embodiment, in order to see the decrypted content, users position their device camera over an area containing the visual encoding(s) of the encrypted content. According to an embodiment, through the camera, the device captures the bits of ciphertext by applying various image-processing techniques to the visual encoding. The device then fetches the decryption key(s) for that ciphertext from the backend, if these were not already present on the user device. Ciphertext is then decrypted (i.e., plaintext) and is displayed to the user either as an overlay or on some other part of the screen of the device. If the plaintext is not meant for user-consumption, it is not displayed to the user but it is used internally by the system.

According to an embodiment, the visual representation is, for example, a representation of either an encrypted pointer (e.g., URI, URL) to the content or an ID that identifies some property of the visual representation (e.g., its position in the world, the name of its owner) or something else. According to an embodiment, additional metadata may be present.

According to an embodiment, the decrypted data is not the actual content the user needs to see but it is a pointer to it or some metadata. According to an embodiment, once the pointer to the actual content has been decrypted, the user device connects to servers in the backend and fetches the proper encrypted content by using the decrypted pointer and any additional information (e.g., time of day, GPS coordinates of user device). A URI may point to an (encrypted) image or a video, for example. On the other hand, an ID may point to some image or text that may change over time as that same ID may give different content if queried at different times.

According to an embodiment, the content fetched from the backend may be displayed as an overlay or anywhere (e.g., at the bottom) on the screen of the device. If the content is not meant for user-consumption, it is not displayed to the user but it is used internally by the system.

Figure 3:
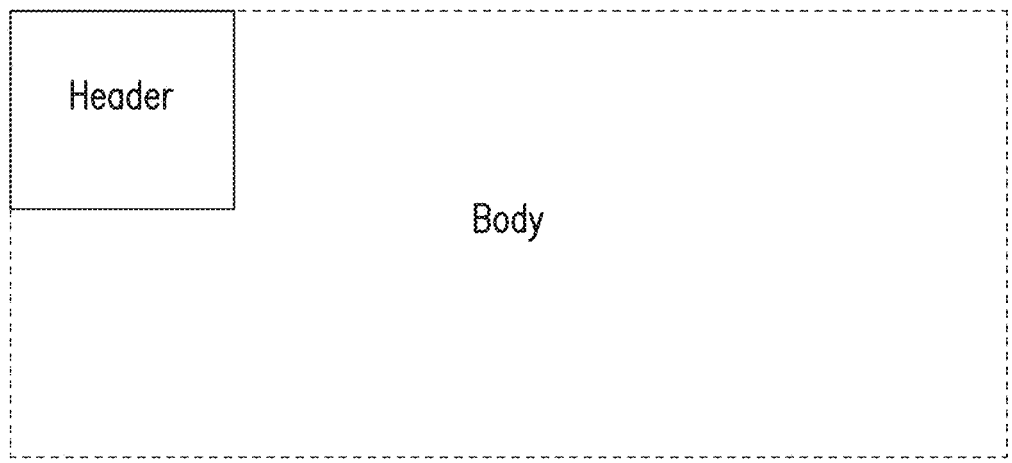
FIG. 3 shows structure of encrypted content, according to an embodiment of the present invention.

According to an embodiment, for the encrypted content to be correctly visually decoded (especially if a custom visual encoding with no landmarks is used), it needs to be organized in a specific way in order to improve efficiency of the decoding process. In particular, before visually encoding the encrypted content, it is organized into a specific structure. One possible structure is shown in FIG. 3.

Generally speaking, Header and Body may use different visual encodings so that, for example, a lower-capacity but more robust visual encoding may be used for the Header in order to make it more resilient to errors. Examples of different visual encodings are: a QR code for the Header and data glyphs for the Body, a one-bit-per-glyph encoding for the Header and two-bit-per-glyph encoding for the Body, a QR code for the Header and data matrices for the Body. In the simplest case, both Header and Body may use the same visual encoding.

Looking now at each field of the structure and its meaning, in the following calculations, it is assumed that the Header is a 12×12 matrix (one-bit-per-glyph visual encoding).

Truncated Hash: truncated first 24 bits of a hash function (e.g., SAH256, HMAC) computed over all other fields of the Header.

Version: this field is NOT encrypted and it represents the version number of the block structure (bits: 24-31).

Rows: this field is NOT encrypted and is 8-bit long. It represents the number of rows in the block including the Header that is, we can have an encrypted content block with a max number of 256−12=244 rows. (This field may be removed or re-assigned in future versions of the block structure.).

Cols: this field is NOT encrypted and is 8-bit long. It represents the number of columns in the block including the Header that is, we can have an encrypted content block with max number of 256−12=244 columns. (This field may be removed in future versions of the block structure.).

Control Bits: this field may contain some special bits (e.g., checksum for error correction, parity bytes, MAC, hash of other fields) and if so, the size of this field may change. Right now it contains either the truncated hash of the encrypted content or some error-correction bits.

Encrypted Content: this field is the actual encrypted content and is N-bit long where N is a variable number up to (244*244*2) bits as per Rows/Cols fields described above. This means a maximum of 14,884 ASCII characters of (encrypted) content into a single block. The size of the following optional field (i.e., M bits) has to be subtracted by these calculations if such field is present.

Extra Data: this field is optional. If required by the encryption algorithm, additional data may be appended in the Body after the Encrypted Content field. This extra data would be used only for decryption operations and, as such, it would not be considered part of the encrypted content. Its size is variable. According to an embodiment, the encryption algorithm can be any state-of-the-art encryption algorithm such as AES256 in GCM mode.

Given the structure defined above, one possible way to search for a valid encrypted block using the present invention is herein described.

According to an embodiment, when the device searches for an encrypted block, it first performs various image-processing transformations (e.g., convert image to a grayscale, apply Gaussian Blur and other filters). Once the initial image processing is complete, the device starts looking for the beginning of a block. In particular, it computes the hash of the 96+8+8+8 bit fields in the Header that it sees and it compares the first 24 bits of this hash to the 24 bits of the Truncated Hash field. If the two match, the device has found a valid block. If the two do not match, the beginning of a valid block has not been found and the search needs to continue.

If a valid block has been found, we look at the Version field first in order to know what version of the block structure this is. In particular, the version number tells us how to interpret the various fields in the block and specific bits within a field. For example, for different versions we may use different header structures, different encryption algorithms or give different meanings to the Control Bits field. Similarly, different versions may define different boundaries, thus different sizes, of the various fields.

In version 0, the Control Bits field may contain the truncated hash of the encrypted content. In other versions, on the other hand, such field may contain: a checksum, an error correction code, a truncated hash of the Encrypted Content field, a Message Authentication Code (MAC), or other. In the case of error correction, this should take place before attempting decryption. In the case of truncated hash of encrypted content, hash verification should take place before attempting decryption in order to make sure that the correct header has been read for the correct content.

After looking at the Version field, we look at the Rows/Cols fields so that we know how many bits we need to read in order to correctly decrypt the encrypted content. Once this is known, we can proceed to read the remaining bits and attempt decryption. In particular, in version 0, the encrypted content to decrypt may be given by the N bits.

Once the encrypted content has been correctly decrypted, it can be either displayed to the user or used "internally" by the system as described above.

According to an embodiment, we may have multiple encrypted blocks scattered throughout a document. It is important to make sure that the order in which this blocks were originally inserted in the document has not been changed. Furthermore, it is important to make sure that none of the blocks has been replaced with some other block not meant to be in that document. In other words, we need to verify the integrity of the encrypted content.

In order to verify integrity, when the encrypted blocks are generated, a hash of all of them is computed. In particular, the headers of the encrypted blocks (or the full blocks) are collected in the exact order in which they appear in the document and a hash (e.g., SHA256) of all of them is computed and saved.

Before performing decryption, if a user wants to verify the integrity of the encrypted parts of a document, it captures the encrypted blocks in the order they appear so that the device can generate the hash. Such hash is then compared to the one generated at encryption time and if the two match then integrity verification succeeds otherwise it fails. A visual cue may be shown to the user in either case.

When capturing blocks for integrity verification, they can be captured all at once by the user or one by one. However, if they are captured in the wrong order, integrity verification will fail. Furthermore, if decryption of any of the blocks fails, integrity verification will also fail.

The technology described herein pertaining to the present invention may be used in a number of novel use cases. Some of which are herein described below. It is noted, however, that the present invention may be used in other novel use cases not mentioned, while maintaining the spirit of the present invention.

Verification Service: In this use case users can secure their online account on a given website so that even if it gets hacked (i.e., a malicious actor can login into the user account) they can:
1. Verify if a transaction/action they are submitting is indeed what they meant to submit/do and no malicious actor modified it in any way.
2. Make sure that no malicious actor can perform an unauthorized transaction/action from their account.

In order to do this, a summary of the transaction (including a transaction ID) is encrypted together with a random PIN/string in an encrypted code. For the transaction to be submitted, users decrypt the encrypted code as described in one of the previous sections and see a summary of the transaction together with a random PIN, for example. Users can see and verify the summary of the transaction to make sure that everything is in order and proceed by inserting the random PIN in an apposite field on the website. Once the PIN is verified, the transaction is executed.

If a malicious actor has modified a transaction initiated by the user the malicious actor would not have access to encryption keys therefore would not be able to generate a fake encrypted summary of such transaction. The modified transaction would then be shown to the user in the encrypted summary and the user would then be able to detect it and decide not to proceed. Similarly, if the malicious actor initiates a new unauthorized transaction, he or she would not be able to decrypt the summary and read the random PIN to use in order to proceed with the transaction. Furthermore, the user may get notified and alerted with the encrypted transaction summary so that he or she may take appropriate action.

FIG. 4 shows an example of a Bitcoin transaction summary using the verification service. Multi-party decryption: In a multi-party decryption, in order to decrypt or unlock some data, multiple parties are required to take part to the process.

There are two ways this can be accomplished:
1. Multiple parties operate sequentially
2. Multiple parties operate in parallel Furthermore, when operating in parallel, external automata can act as the gatekeeper (e.g., a multi-signature contract in the Ethereum blockchain) where two instances (from either the same or different users) are required to have decrypted the same content and signed the transaction in order for the transaction to go through.

For both parallel and sequential modes of operation, the method may involve parts of the same key held by different parties or it might involve keys of encryption keys creating a chain of custody, or it might involve disparate information needed to create or retrieve the encryption/decryption keys.

Two examples of how multi-party decryption may work follow. In a first example, we encrypt some data and encode it in a QR code, for example. The whole QR code is then encrypted using a different encryption key. When decryption needs to happen, one party is given the decryption key to decrypt the QR code and another party is given the decryption key to decrypt the content of the QR code.

Figure 5:
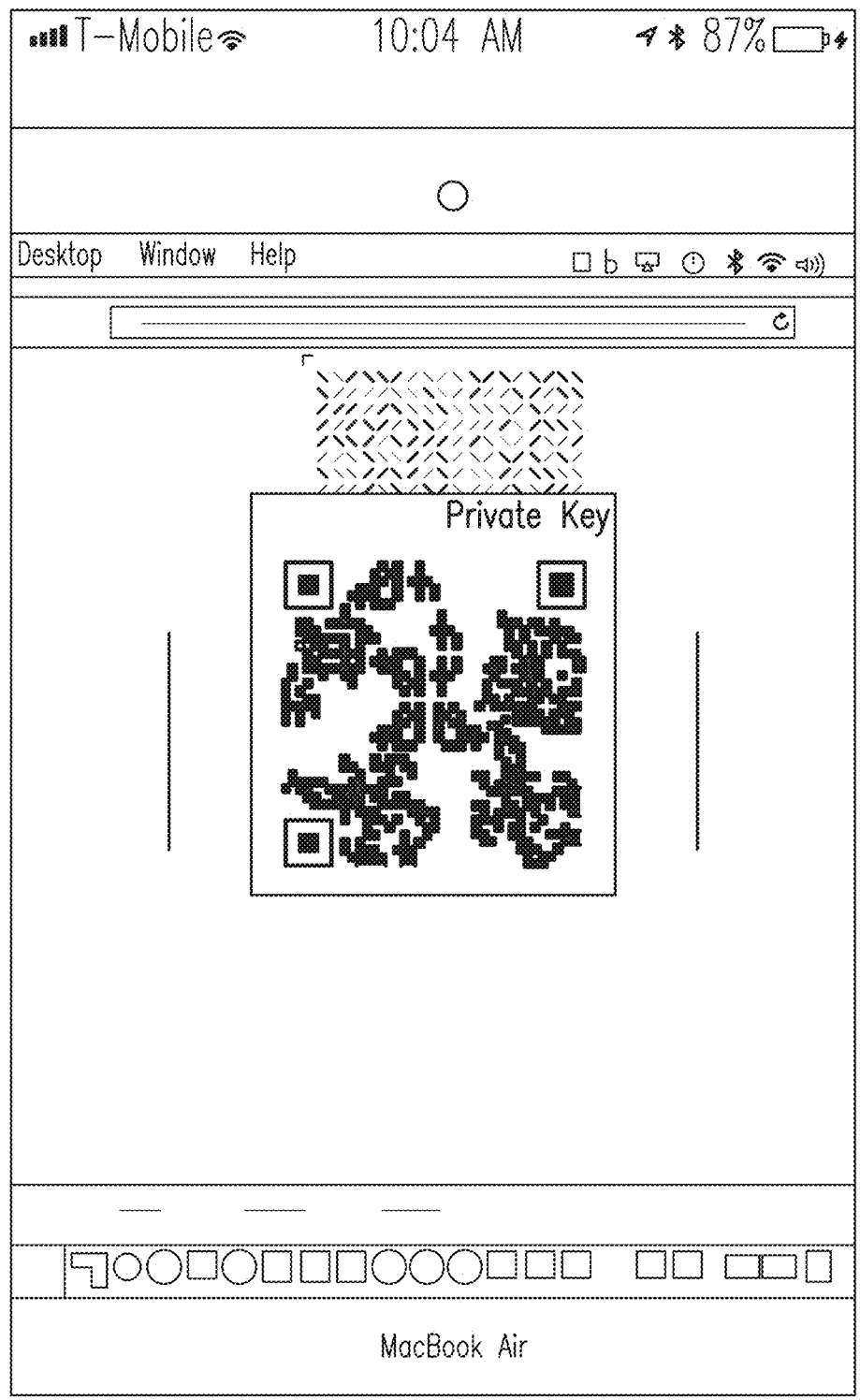
FIG. 5 shows a QR code decrypted by a user, according to an embodiment of the present invention.

FIG. 5 shows the decryption of the QR code by the first user. Once decrypted, the device of the second user can scan the QR code and decrypt its content. Such a device, in fact, will have the decryption key to decrypt the content of the QR code.

It is important to notice that the QR code and its encryption can be built in such a way so that the same QR code cannot be used more than once. In doing so, we prevent a situation where the second user takes a picture of the QR code (i.e., after user 1 has decrypted it) and uses it anytime he or she wants without requiring the first user to be there. In order for this to be possible, the encryption of the QR code may be a URL pointing to a dynamically created encrypted QR code.

Figure 7:
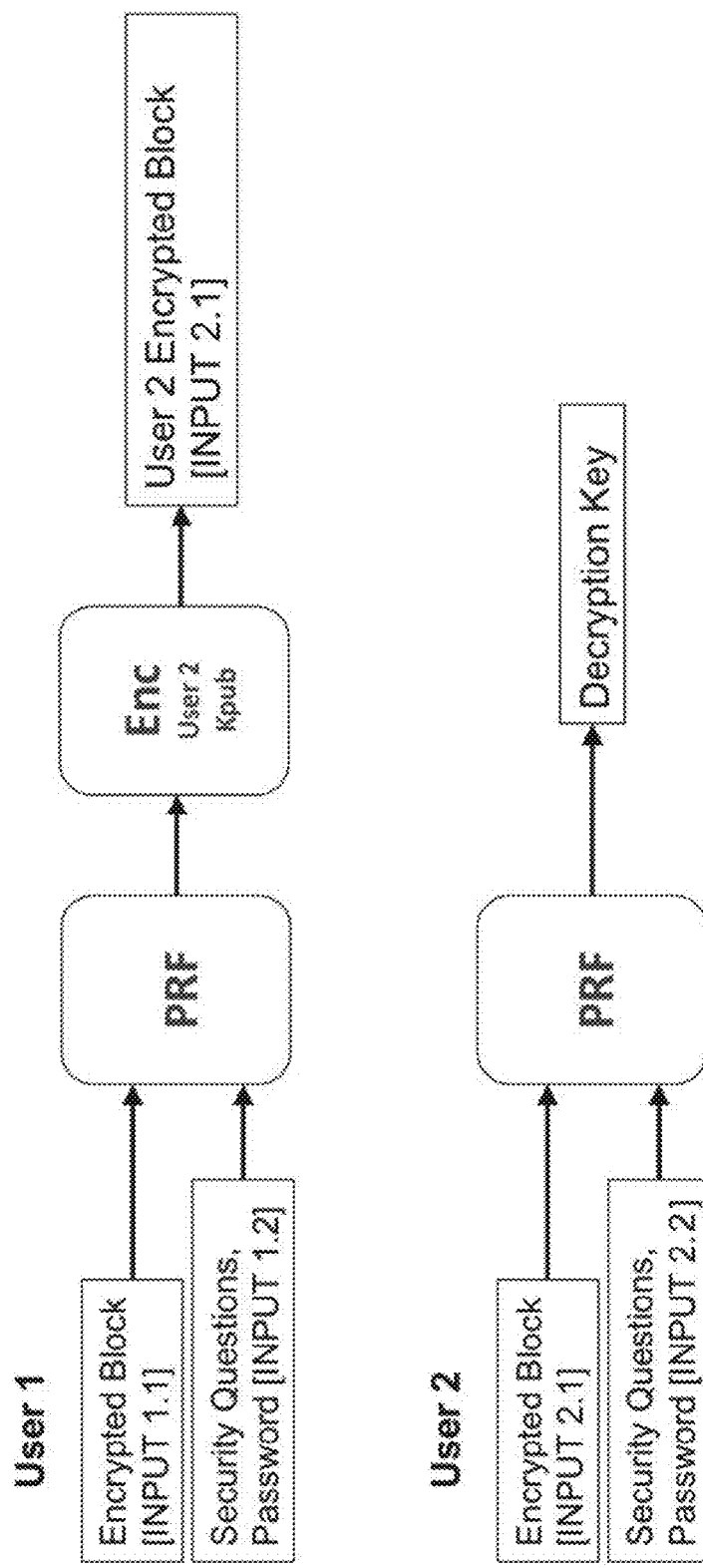
FIG. 7 shows an example of multi-party decryption, according to an embodiment of the present invention.

In a second example, User 1 has access to an encrypted block containing some input data (INPUT1.1) and User 2 has access to an encrypted block containing a wallet private key or some sensitive data to decrypt. In such a scenario (see FIG. 7), User 1 decrypts an encrypted block containing an input value (INPUT1.1). He or she then inserts answers to security questions, a password or similar (INPUT 1.2). Both inputs INPUT1.1+INPUT1.2 are then used as inputs to a PRF or similar function. User 1 then encrypts the output of the PRF [INPUT 2.1] using User 2 public key and encodes it in an encrypted block, a QR code or other visual encoding (this can be time limited, single use, etc.). User 2 decrypts this encrypted block using its private key and gets the input (INPUT 2.1). As a second step, User 2 inserts answers to security questions, a password or similar (INPUT 2.2). Both inputs INPUT2.1+INPUT2.2 are then used as inputs to a PRF or similar function. The output of the function is the encryption key that User2 needs to use in order to decrypt the encrypted block with the wallet private key or other sensitive data for User 2.

Enforcing Multi-Party Access: In the previous section we have seen how it is desirable that, in multi-party decryption, User 2 can decrypt its encrypted content without User 1 taking action (e.g., User 2 could take a picture of the QR code decrypted by User 1 and use it at any time without User 1 even noticing). In the following we describe a possible way to enforce the presence of both User 1 and User 2 in order to decrypt content and prevent the aforementioned problem.

When a QR code is encrypted in an encryption block, some metadata can be associated with this QR code. Such metadata may include: number of times this QR code can be decrypted (see FIG. 5), a date after which decrypting of the QR code is disabled, time allowed to decrypt the content of the QR code from the moment the QR code was decrypted, and so on. In particular, the hash of the encryption block and the hash of the QR code are saved on the server with the associated metadata.

In one of many scenarios, when User 1 decrypts the QR code (see FIG. 5), the hash of the encrypted block is sent to the server and the event of the decryption will be registered with the server in the backend.

When User 2 scans the QR code (displayed by User 1) in order to decrypt its content, his or her device will send the hash of the QR code to the server. The server will check the metadata associated with the QR code and will grant or deny its decryption. For example, decryption of the content of the QR code may be possible only within a certain amount of time from the moment the QR code was decrypted by User 1. Similarly, decryption of the content of the QR code may be possible only a limited amount of times after which attempts to decrypt the content of the QR code would fail.

It is important to note that QR codes are just used as an example and that any other visual representation may be used in their place.

Ice-Cold Wallet Transactions: An ice-cold wallet is a cold wallet where Blockchain private keys are encrypted in an encryption code and printed on paper (i.e., kept offline).

Furthermore, the decryption keys used to decrypt the Blockchain private keys are also encrypted in a different encryption code and printed on paper (i.e., kept offline).

Such "offline" content can be kept in bank vaults or any other location and can be decrypted by using a mobile application or any automata following the protocol specified in the invention.

When the user needs to sign a transaction, he or she needs to decrypt the encryption code containing the Blockchain private keys. In order to do this the following happens;
1. The user device retrieves (from the company servers) the decryption keys used to decrypt the decryption keys of the wallet.
2. The user device decrypts the decryption keys and proceeds to decrypt the Blockchain private keys
3. The user device loads the Blockchain private keys and signs the transaction on the device
a. Alternatively, the signing can be done on another server where the keys are made available securely
4. The signed transaction can be moved "online" into the Blockchain or sent to a blockchain node According to an embodiment, when performing a multi-party transaction, there are two modes of operation for signing the transaction: parallel and sequential.

In parallel mode, user 1 signs the transaction and sends it to (company) servers. At the same time user 2 signs the same transaction and sends it to the company servers independently from user 1. The company servers, interacting with the Blockchain will post the transaction to the Blockchain (e.g., Ethereum) where it will be validated once signed by both users. This validation can be done using another smart contract or some in-memory logic.

In sequential mode, user 1 and user 2 need to sign the transaction one after the other before such transaction is posted to the Blockchain. Once user 1 signs the transaction, he or she can send the partially signed transaction to user 2's device (e.g., via NFC, VPN) so that also user 2 can sign it. Only after both users sign the transaction, such transaction is sent to the (company) servers that will then publish it to the Blockchain (e.g., Bitcoin).

Also, in this use-case, we can have both multi-party and single-party modes of operation.

Time-Based Decryption: At any time, in the previous use cases, the ability to decrypt an encrypted code can be revoked on demand by revoking the decryption key associated with that document. For time-based decryption, we enhance this functionality by allowing the content creator to specify an expiration deadline for an encrypted code. In doing so, whomever has access to such encrypted code, will be able to decrypt it up to the expiration deadline. Once the deadline has passed, decryption keys will be removed and/or erased from all (or some) users devices having access to this encryption code. Furthermore, additional steps may be taken in order to prevent users from decrypting the expired encryption code (e.g., decryption fails if device has not Internet access).

Figure 6:
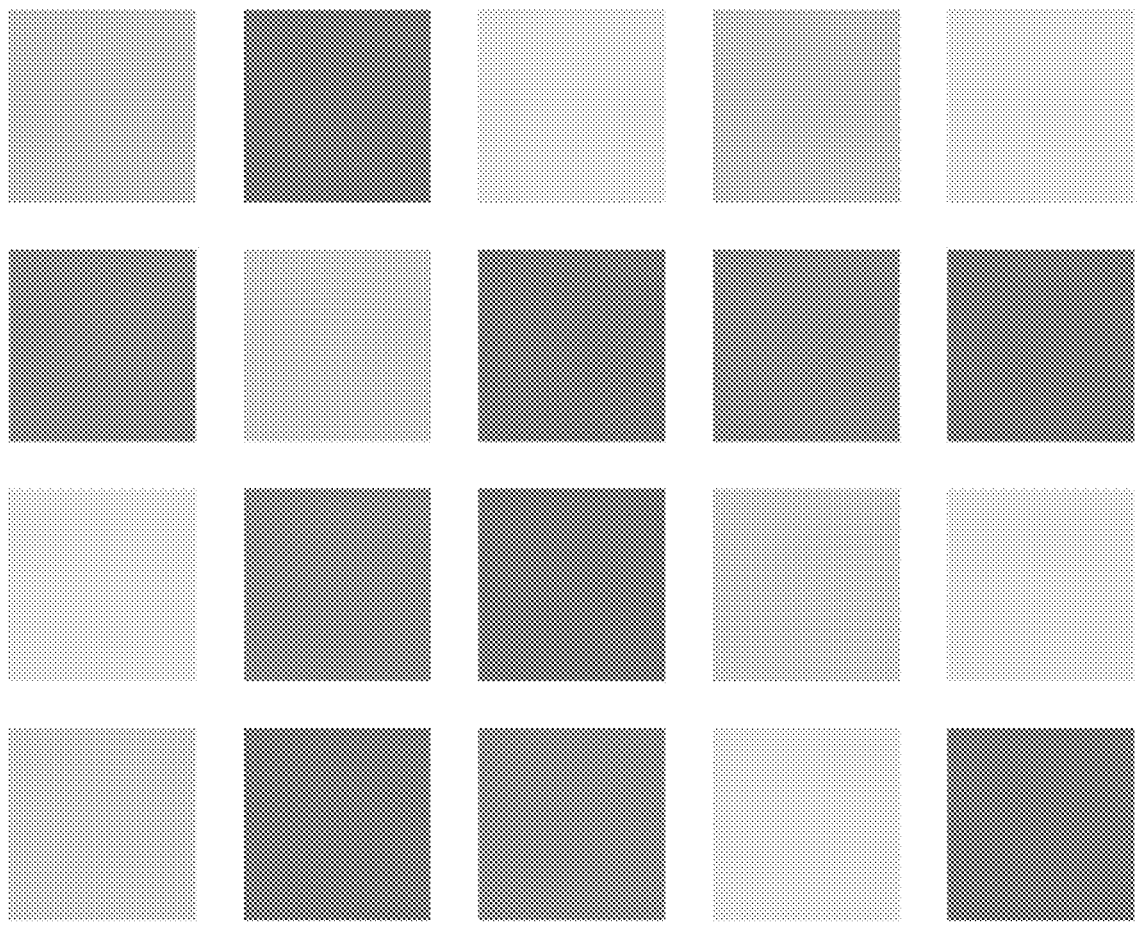
FIG. 6 shows an example of CAPTCHA replacement, according to an embodiment of the present invention.

CAPTCHA Replacement: In such use case, we encrypt a pattern of squares, such as those shown in FIG. 6. According to an embodiment, the squares are colored squares. According to an embodiment, the user is then asked to press on the screen all the squares of a certain color (e.g., press all the yellow squares). Alternatively, we can ask users to follow more complex patterns such as alternatively pressing squares of two different colors (e.g., alternatively press yellow and red squares) until all squares of those two colors have been pressed. Other mechanisms not involving colors may also be used.

Mutual Authentication: Content may be encrypted by using either symmetric key encryption or asymmetric key encryption. When asymmetric keys are used the content may be additionally signed by the party encrypting it and the signature included in the encrypted content.

When encrypted content is decrypted by the user (and signature is verified in the case of asymmetric keys) the authentication of both parties can be implied.

In particular, assuming symmetric-key encryption, the encrypted content may include, among other things, a time-stamp of the encryption, an alphanumeric code, any other identifier of the other party. For a website, such identifier can be the domain name associated with the website, for example:

On the user side, by decrypting such encrypted content (and by verifying the signature if asymmetric-key encryption is used), the user can assume that the remote party is the legitimate party since it had the correct secret keys necessary to perform the encryption (or sign it). Additionally, the decrypted domain name, in the case of authentication to a website, can be visually verified by the user and compared to the domain name appearing in the browser address bar or similar.

On the other-party side (e.g., a webserver), the user is authenticated by providing the alphanumeric code provided as part of the encrypted content. This alphanumeric code can be a single-use code. By providing such code to the webserver, the user proves that has access to the crypto-material necessary to correctly decrypt such code and hence is the legitimate user.

This mutual authentication scheme can be used for various use-cases such as website login and multi-factor authentication. In particular, the user provides his or her username (or any other unique identifier) and the remote party (e.g., a website) replies with the encrypted content described above where content was encrypted using the crypto-material assigned to that user.

Sharing Images: Images can be shared by encrypting and encoding a URL to the image with some additional metadata. Such metadata may include, for example, a random alphanumeric code necessary in order to download and display the image to the user.

In particular, when a user decrypts the encrypted code pointing to an image, the user device will process the decrypted URL and will provide the decrypted alphanumeric code to the backend. Only if successful, the image will be downloaded and displayed to the user.

According to an embodiment, additional metadata may be included in the encrypted content or may be provided by the user device (e.g., time of day, location information). Such additional information may be used to enable new services (e.g., location based services) and provide different content to the user (e.g., a store coupon code) when paired with the encrypted/decrypted content.

For example, an encrypted code with an encrypted URL may be used to display an alphanumeric code to give access to a restricted area. Such decrypted URL together with time of day and the device location would return an image of an alphanumeric code to use at that time for access to the restricted area. The user could then use such code in order to enter the restricted area. At a different time of day a different code may be displayed for the same encrypted content. Access to the decrypted image may be denied if the device location does not match the encrypted code location.

Paper Documents: Encrypted codes can be used to encrypt pieces of sensitive information in paper documents and the likes. Examples include: social security cards, passports, company ID cards, tax returns. Furthermore, additional data decryptable only by Government or company officials may be included in such documents.

For example, a passport may include an encrypted code containing personal information such as full name, date of birth, passport number, expiration date, picture of the passport owner. Such information may also be present in unencrypted text form. A government official may verify if a passport is counterfeit or not by comparing the text in the passport with the encrypted information in the encrypted code. Furthermore, there could be some other information encrypted on the passport, which may contain (or point to) sensitive content such as violations, police records, DMV records, decryptable only by the government/company official and not by the passport owner.

Mixed Media: A paper (or electronic) card containing an encryption block needs to be placed in the same camera view with other encryption blocks (either electronic or paper). By placing the blocks in the right order, an Integrity Verification operation is performed and if it succeeds then decryption happens by using as decryption key the key encrypted in the paper card encryption block.

According to an embodiment, in a different scenario, a password encrypted in the paper card is displayed to the user only if an Integrity Verification operation succeeds.

According to an embodiment, a multi/second factor device (i.e., hardware or software) may need to be updated under different circumstances. For example, the user may decide to upgrade their cellphone device or perhaps their cellphone gets stolen. In either of these cases, the user users need access to their digital assets in order to take some action.

According to one scenario, for example, if a user upgrades his or her cellphone device, an encrypted challenge is displayed to the user. This challenge can be decrypted with the old device and its content can be inserted (together with some other information such as username and password) in a form on the new device in order to trigger a new registration or login from the new device thus connecting old device/identity to new device. A second factor is then transferred to the new device.

According to another scenario, for example, in order to recover from the loss of a second factor device (software or hardware) without requiring a re-boarding or re-installation of a new second factor, the concept of human second factor recovery is introduced.

Since users have protected access to their assets with a second factor, they need a way to access their assets using second factor authentication without their second factor authentication device or software (e.g., their stolen cellphone). This is required also for users to be able to simply freeze or lock their account if, for example, their device was stolen. In order to do this, users register with their second factor provider one or more work colleagues or "friends" (e.g., their email address, their phone number). If the user device is stolen, for example, users can access a "recovery mode" with their second factor provider (e.g., using username and password), which will allow them to trigger the delivery of a one-time code to one of their registered friends (which they can select from a list). When their friend receives this one-time code (either encrypted or not), users ask their friend for the code (e.g., over the phone). By using this one-time code together with other credentials (e.g., username, password, security questions) users can get access to their account and their digital assets and take action (e.g., freeze account, lock sell/buy, reset second factor on any device).

When introducing elements of the present disclosure or the embodiments thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for encrypting and decrypting data using visually encoded ciphertext, the method comprising:
   selecting, using a graphical user interface coupled to an electronic device, one or more portions of sensitive content of a document to be encrypted;
   visually encoding the selected one or more portions of sensitive content of the document to generate a visual representation, wherein the visual representation corresponds to encrypted content;
   replacing, in a same position, the selected one or more portions of sensitive content of the document with the visual representation corresponding to the encrypted content;
   displaying, to the user, the visual representation that includes a mixture of the encrypted content and unmodified original content corresponding to non-sensitive sections of the document;
   capturing the visual representation using one or more cameras;
   decoding the visual representation, obtaining the encrypted content;
   decrypting the encrypted content, generating decrypted content;
   overlaying the decrypted content over one or more objects, wherein the one or more objects are distinct from the visual representation; and
   anchoring the decrypted content to the one or more objects on the graphical user interface.

2. The method of claim 1, further comprising:
   positioning, by the user, a camera of the electronic device over an area containing the visual representation corresponding to the encrypted content;
   applying, by the electronic device, image-processing techniques to the visual representation to capture bits of ciphertext;
   fetching, by the electronic device, decryption keys for the ciphertext from a backend; and
   decrypting, by the electronic device, the ciphertext.

3. The method of claim 2, further comprising:
   displaying, via the GUI, decrypted ciphertext as an overlay to the visual representation.

4. The method of claim 2, further comprising:
   displaying, via the GUI, decrypted ciphertext on another location on the GUI distinct from a location of the visual representation.

5. The method of claim 2, wherein the visual representation is an encrypted pointer to the selected one or more portions of sensitive content or an identification that identifies a property of the visual representation.

6. The method of claim 2, wherein decrypted ciphertext and corresponding plaintext is used internally.

7. The method of claim 1, wherein the encrypted content comprises: Quick Response Codes, bar codes, a custom or visual encryption format, data matrices, or data glyphs.

8. The method of claim 1, wherein each of the one or more objects comprise an image, a logo, or an advertisement.

9. The method of claim 1, wherein encryption occurs via symmetric key encryption or asymmetric key encryption.

10. The method of claim 1, wherein a decryption process includes a time-based decryption process.

11. The method of claim 10,
wherein the encrypted content is capable of decryption until an expiration deadline expires, and
wherein, when the expiration deadline expires, decryption keys are removed or erased from any device having access to an encryption code.

12. A system for encrypting and decrypting data using visually encoded ciphertext, the system comprising:
a first electronic device comprising a first graphical user interface, a first memory, and a first processor, wherein the first graphical user interface is configured to enable a user to select one or more portions of sensitive content of a document to be encrypted, and wherein the first processor is configured to:
visually encode the selected one or more portions of sensitive content of the document, generating a visual representation, wherein the visual representation corresponds to encrypted content;
replace, in a same position, the selected one or more portions of sensitive content of the document with the visual representation corresponding to the encrypted content; and
display, to the user, the visual representation that includes a mixture of the encrypted content and unmodified original content corresponding to non-sensitive sections of the document; and
a second electronic device comprising a second graphical user interface, a camera, a second processor, a display, and a second memory, wherein the camera is configured to capture the visual representation, and wherein the second processor is configured to:
decode the visual representation, obtaining the encrypted content;
decrypt the encrypted content, generating decrypted content;
overlay the decrypted content over one or more objects, wherein the one or more objects are distinct from the visual representation; and
anchor the decrypted content to the one or more objects on the display.

13. The system of claim 12, wherein the second processor is further configured to:
apply image-processing techniques to the visual representation to capture bits of ciphertext;
fetch decryption keys for the ciphertext from a backend; and
decrypt the ciphertext.

14. The system of claim 13, wherein the display is further configured to depict decrypted ciphertext as an overlay to the visual representation.

15. The system of claim 13, wherein the display is further configured to depict decrypted ciphertext on another location distinct from a location of the visual representation.

16. The system of claim 12,
wherein the encrypted content comprises: Quick Response Codes, bar codes, a custom or visual encryption format, data matrices, or data glyphs, and
wherein each of the one or more objects comprise an image, a logo, or an advertisement.

17. The system of claim 12, wherein encryption occurs via symmetric key encryption or asymmetric key encryption.

18. The system of claim 12, wherein the second processor is further configured to:
execute a time-based decryption process to decrypt the visual representation, wherein the encrypted content is capable of decryption until an expiration deadline expires, and wherein, when the expiration deadline expires, decryption keys are removed or erased from any device having access to an encryption code.

19. A method for encrypting and decrypting data using visually encoded ciphertext, the method comprising:
selecting, using a graphical user interface (GUI) coupled to an electronic device, a first set of sensitive content of a document and a second set of sensitive content of the document to be encrypted, wherein the first set of sensitive content is distinct from the second set of sensitive content;
visually encoding the first set of sensitive content of the document to generate a first visual representation and the second set of sensitive content of the document to generate a second visual representation, wherein the first visual representation corresponds to a first encrypted content, and wherein the second visual representation corresponds to a second encrypted content;
replacing, in a same position, the first set of sensitive content with the first visual representation corresponding to the first encrypted content and the second set of sensitive content with the second visual representation corresponding to the second encrypted content;
displaying, to the user, the first visual representation and the second visual representation, wherein the first visual representation comprises a mixture of the first encrypted content and unmodified original content corresponding to non-sensitive sections of the document, and wherein the second visual representation comprises a mixture of the second encrypted content and the unmodified original content corresponding to the non-sensitive sections of the document;
capturing the first visual representation and the second visual representation using one or more cameras;
decoding the first visual representation to obtain the first encrypted content and the second visual representation to obtain the second encrypted content;
decrypting the first encrypted content to generate a first decrypted content and the second encrypted content to generate a second decrypted content;
overlaying the first decrypted content over a first set of objects and the second decrypted content over a second set of objects, wherein the first set of objects are distinct from the first visual representation, and wherein the second set of objects are distinct from the second visual representation; and
anchoring the first decrypted content to the first set of objects and the second decrypted content to the second set of objects on the GUI.

20. The method of claim 19, further comprising:
positioning, by the user, a camera of the electronic device over an area containing the first visual representation and another area containing the second visual representation;
applying, by the electronic device, image-processing techniques to the first visual representation to capture first bits of ciphertext and the second visual representation to capture second bits of ciphertext;

fetching, by the electronic device, decryption keys for the first bits of ciphertext and the second bits of ciphertext from a backend; and simultaneously decoding and decrypting, by the electronic device, the first bits of ciphertext and the second bits of ciphertext.

\* \* \* \* \*